United States Patent [19]

Hutchins

[11] 4,210,897

[45] * Jul. 1, 1980

[54] HEAVE COMPENSATION SYSTEM

[75] Inventor: Roger Hutchins, Toronto, Canada

[73] Assignee: Huntec (70) Limited, Scarborough, Canada

[*] Notice: The portion of the term of this patent subsequent to May 23, 1995, has been disclaimed.

[21] Appl. No.: 883,076

[22] Filed: Mar. 3, 1978

Related U.S. Application Data

[63] Continuation of Ser. No. 747,588, Dec. 6, 1976, Pat. No. 4,091,356.

[51] Int. Cl.² ............................................... G01V 1/38
[52] U.S. Cl. ................................... 367/106; 114/244; 181/110
[58] Field of Search ................... 340/3 PC, 3 T, 7 R, 340/7 PC; 114/244; 181/110

[56] References Cited

U.S. PATENT DOCUMENTS 4,091,356  5/1978  Hutchins ............................. 340/3 T

OTHER PUBLICATIONS

Sothcott et al; *Proceedings of the Conference on Electronic Engineering in Ocean Technology;* Swansen, Wales; Sep. 1970.

*Primary Examiner*—S. C. Buczinski
*Attorney, Agent, or Firm*—Rogers, Bereskin and Parr

[57] ABSTRACT

A heave compensation system for an underwater towed seismic system of the kind in which a body containing a sound source and hydrophones is towed behind a ship, and a recording is made of echoes from the bottom and sub-bottom layers. An accelerometer in the towed body produces a signal indicative of the vertical acceleration of the body. The acceleration signal is double integrated within a frequency range having a low frequency roll-off to produce a position signal which is used to adjust the firing time of the source. If the fish heaves upwardly, the firing time is advanced; if the movement is downwards, the firing time is delayed. Preferably a pressure transducer in the fish produces a pressure signal which is also used to adjust the source firing time, for pressure variations below the lowest likely wave frequency. The crossover of the pressure and acceleration compensation systems is typically about 0.01 Hz.

3 Claims, 12 Drawing Figures

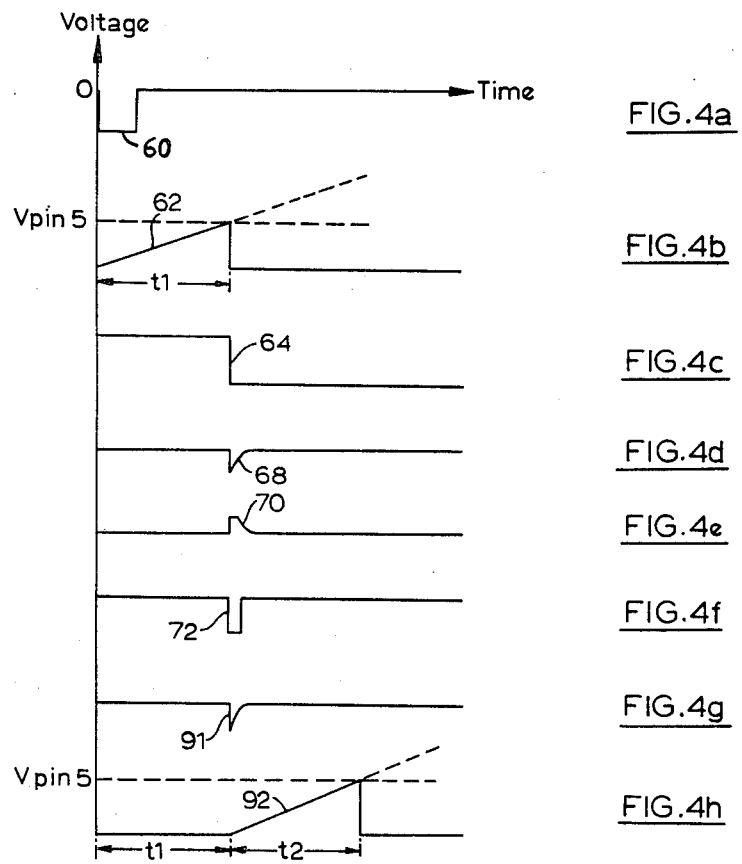
FIG.4a
FIG.4b
FIG.4c
FIG.4d
FIG.4e
FIG.4f
FIG.4g
FIG.4h
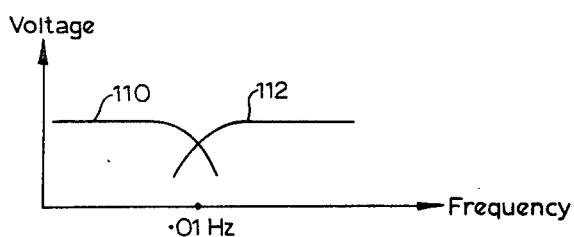
FIG.5

HEAVE COMPENSATION SYSTEM

This is a continuation of application Ser. No. 747,588 filed Dec. 6, 1976, now U.S. Pat. No. 4,091,356.

This invention relates to an underwater seismic system with heave compensation.

Underwater seismic systems are used extensively in underwater surveying, to determine the profile of the bottom and of the sub-bottom terrain. The systems usually include a towed body or "fish" containing a sound source, and also containing sound receivers or hydrophones. The sound source produces a series of sound pulses which are reflected from the bottom and from sub-bottom layers, the echoes being received at the hydrophones. The hydrophone signals are transmitted through the towing cable to a recorder on the towing ship, where the times of arrival for the various echoes are recorded. As the ship travels forwardly, and as repeated sound pulses are broadcast, a chart is produced of the bottom and sub-bottom terrain.

In conventional towed systems of the kind described, the charts produced may be degraded by vertical motions of the towed body due to ship heave in rough seas. In addition, if the towed body is near the surface, it is acted on directly by wave motion. Such rough seas can induce towed body heave of several meters peak to peak. This movement reduces the resolution of the chart which is produced and results in a fuzzy appearance and loss of fine detail of the layers being recorded.

A further difficulty with conventional systems is that when the depth of the towed body is adjusted (eg. if the water depth varies), the position of the seabed on the chart changes. This complicates interpretation.

Accordingly, it is an object of the present invention to provide a heave compensation system which reduces the effect of towed body heave on the resolution of the chart produced. In a preferred embodiment of the invention, the trigger pulse for the source, which is generated by the sweep recorder used each time the recorder begins to sweep, is adjusted in accordance with the instantaneous vertical displacement of the towed body. Specifically, an accelerometer is located in the body and produces a signal indicative of the vertical acceleration of the body. The acceleration signal is double integrated within a frequency range having a predetermined low frequency rolloff, to produce a position signal approximately indicative of the vertical position of the body, for accelerations within the frequency range. The position signal is used to adjust the firing time of the source. Thus, for example, if the fish heaves upwardly, in which case echoes would normally arrive later, the source firing instant is advanced accordingly.

In a preferred embodiment of the invention, the fish is also provided with a pressure transducer which provides a depth signal which is also used to adjust the firing time of the source. When this is used, slow adjustments which are made in the depth of the fish will not cause changes in the position of the seabed on the recording. This is particularly useful when the water depth varies and it is desired to vary the fish depth to keep the fish relatively close to the bottom surface, to avoid sound energy losses caused by transmission through a long water column. If desired, a combination of acceleration and depth signals or either signal alone can be used to adjust the source firing instant. Further objects and advantages of the invention will appear from the following description, taken together with the accompanying drawings, in which:

FIGS. 4a-h show waveforms for the system of the invention; and

Figure 2:
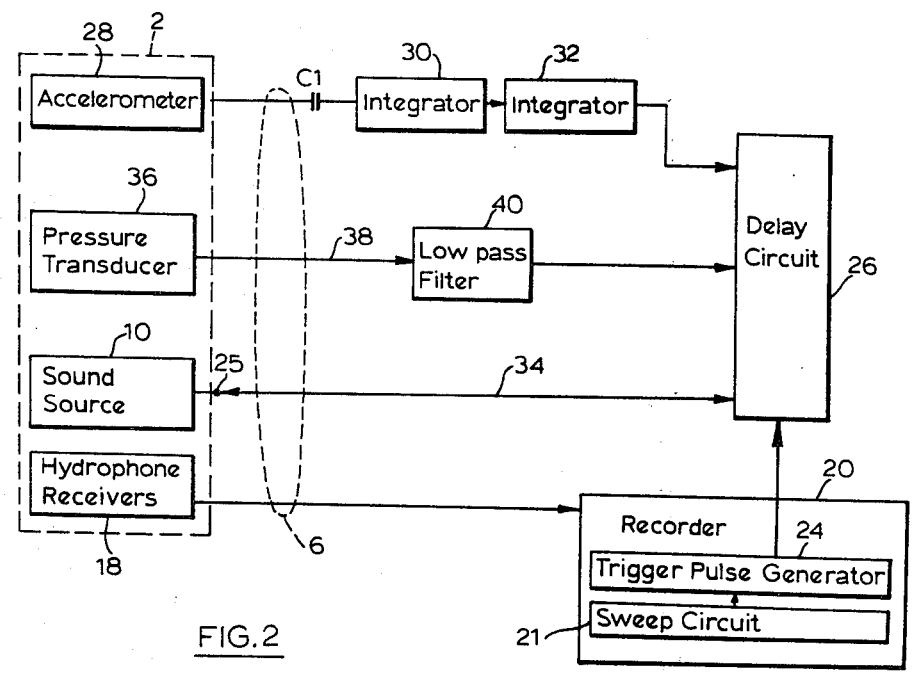
FIG. 2 is a block diagram of a system according to the invention.

FIG. 5 shows typical frequency response curves for portions of the FIG. 2 block diagram.

GENERAL DESCRIPTION

Figure 1:
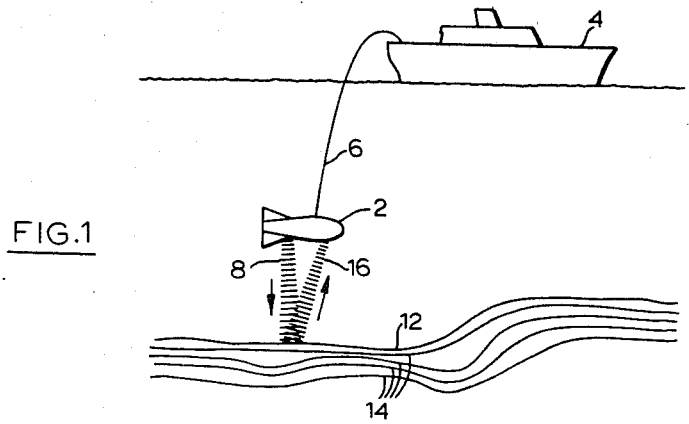
FIG. 1 is a diagrammatic representation of a towed body being towed by a ship above a stratified bottom.

Reference is first made to FIG. 1, which shows a towed body or fish 2 towed by a ship 4 via a towing cable 6. Sound waves diagrammatically indicated at 8 are emitted by a source 10 (FIG. 2) in the fish 2 and are reflected by the bottom surface 12 and by various strata 14 beneath the bottom. The echoes, diagrammatically indicated at 16, are picked up by hidrophones 18 (FIG. 2) in the fish 2. The signal from the hydrophones 18 are transmitted through the towing cable 6 to a recorder 20 in the ship, to produce a chart of the bottom profile. Power for the source 10 is provided from the ship via the cable 6.

The recorder 20 is a conventional chart or drum recorder of the kind having a repetitive sweep operated by a sweep circuit 21. A typical recorder which may be used is Recorder Model No. 4600 made by EPC Labs, Inc. of Beverly, Mass., U.S.A. In this conventional recorder, each time the sweep circuit 21 initiates a sweep across the chart (not shown), a trigger pulse is generated by a trigger pulse generator 24. In the prior art this trigger pulse is applied directly to a trigger terminal 25 of the source 10 to trigger the source 10.

According to the invention, the trigger pulse from the recorder 20 is instead applied to a delay circuit 26. The delay circuit 26 is also supplied via capacitor C1 with a signal from an accelerometer 28 located in the fish 2. The signal from the accelerometer 28 is double integrated by two integrators 30, 32 connected in cascade, and the resultant position signal is used to adjust the delay produced by the delay circuit 26. The delay circuit 26 produces a trigger pulse delayed from the recorder trigger pulse by a timed interval which is dependent on the vertical position of the fish 2. The delay circuit trigger pulse is applied via conductor 34 of the cable 6 to the source 10.

The fish 2 may also contain a pressure transducer 36, which feeds a pressure signal via conductor 38 of cable 6 and through a low pass filter 40 to the delay circuit 26. The delay circuit 26 is arranged to respond to pressure signals (which indicate the depth of the fish) from the pressure transducer 36 and to adjust the firing time of the source 10 accordingly. As will be explained, pressure signal fluctuations above a selected frequency are filtered out by the low pass filter 40, to eliminate changes in pressure due to waves rolling above the fish.

DETAILED DESCRIPTION

Figure 3:
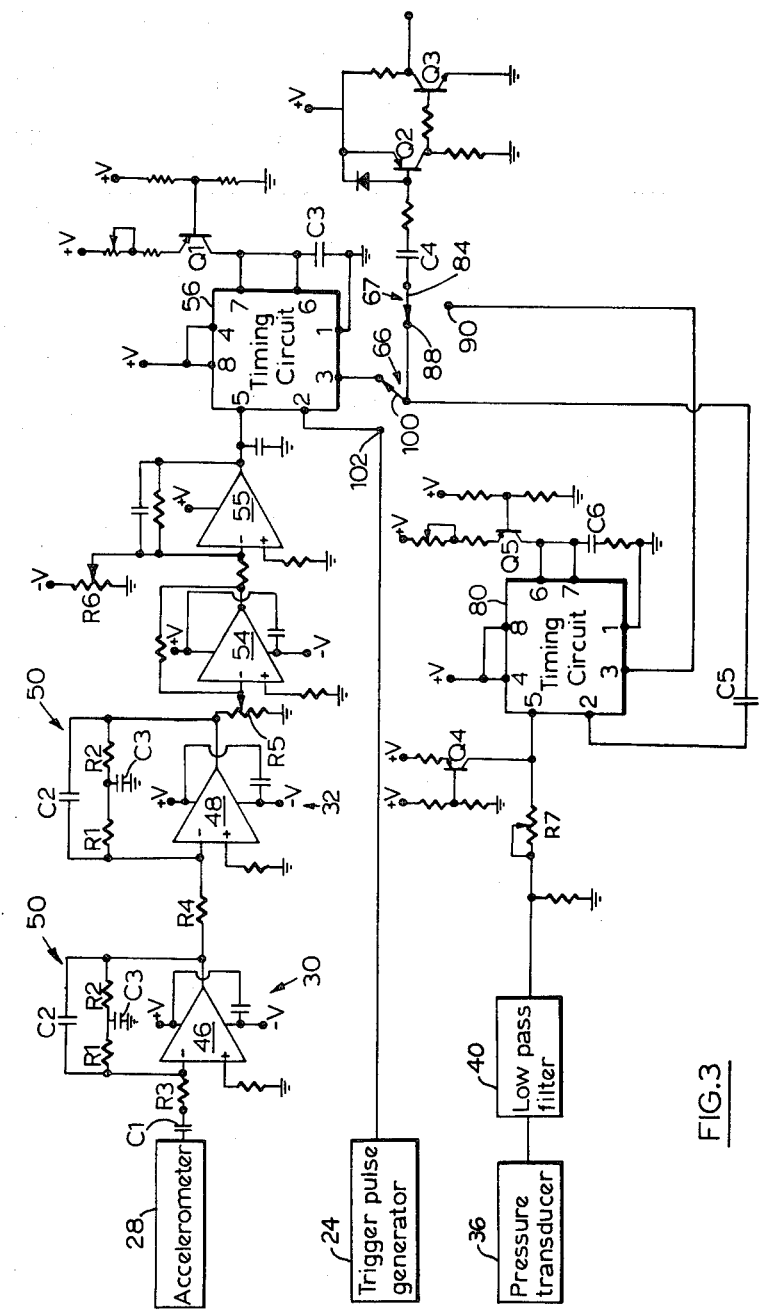
FIG. 3 is a schematic showing a portion of the FIG. 2 block diagram.

Reference is next made to FIG. 3, which shows the integrators 30, 32 connected to the accelerometer 28. As shown, each integrator consists of an operational amplifier 46, 48, typically model No. LH0052 made by National Semiconductor Corp. of Santa Clara, California, U.S.A. Each amplifier 46, 48 is supplied with positive and negative voltages +V, −V (typically +15 volts and −15 volts), and each amplifier includes a feedback network 50 connected between its output and input. Each feedback network 50 as shown includes a capacitor C2 in parallel with resistors R1, R2. The midpoint of resistors R1, R2 is connected by capacitor C3 to ground. Each feedback network 50 constitutes a high pass filter which, when connected in the feedback loop of its amplifier, provides an integrating function. With the values shown, the integrators 30, 32 will integrate input signals of frequency down to a rolloff at about 0.01 Hz. At lower frequencies, the output of each amplifier 46, 48 is simply the input multiplied by the gain of the amplifier. Thus, if the input to each integrator becomes steady state, the output of the integrators 30, 32 also eventually falls to a steady value. The non-ideal performance of the integrators ensures that they will remain stable and will not saturate due to integration of d.c. errors or stray signals.

In addition, it will be seen that a blocking capacitor C1 is connected between the first integrator 30 and the accelerometer 28. Capacitor C1 blocks all d.c. signals from the accelerometer 28 and is used because the d.c. level from the accelerometer 28 may vary in a manner which cannot easily be compensated. The reason for this is that a conventional accelerometer normally, when in stable vertical position, produces a d.c. signal proportional to the force of gravity. However, if the fish rolls or tilts, this will decrease the d.c. signal by a factor equivalent to the cosine of the tilt angle. Since it is difficult to generate a d.c. offset signal which will compensate for the roll of the fish, it is found best to block all d.c. signals from the accelerometer and to permit only a.c. signal, indicative of accelerations above a selected rolloff frequency (typically above 0.01 Hz) to pass.

In order to reduce the value of capacitor C1 to a minimum, input resistor R3 of amplifier 46 is made quite large. This reduces the closed loop gain of amplifier 46, and therefore the closed loop gain of the second amplifier 48 is increased by providing it with a smaller input resistor R4. In a prototype embodiment of the invention, the closed loop d.c. gain of amplifier 46 was 2 and the closed loop d.c. gain of amplifier 48 was 20.

The double integrated output signal from integrator 32 is adjusted as to level by potentiometer R5 and is then amplified by amplifiers 54, 55 and is then applied to a pin 5 of a monostable timing circuit 56. Timing circuit 56 is typically a conventional timing circuit model No. LM555 made by National Semiconductor Corp. of Santa Clara, California, U.S.A. The numbers inside circuit 56 denote pin numbers. In this timing circuit, pin 3 is normally held low, but the circuit can be triggered by an input on pin 2. After the circuit has been triggered, it unclamps pins 6 and 7, and pin 3 goes high until the voltage on pin 6 becomes equal to that on pin 5, at which time pin 3 goes low again. The timing circuit 56 thus acts in a monostable mode.

In the arrangement shown, the output of amplifier 55 is connected to pin 5 of timing circuit 56. The trigger pulse generator 24 of recorder 22 is connected to pin 2 of timing circuit 56. Pins 6 and 7 of timing circuit 56 are connected together to the collector of a transistor Q1, which is connected in a constant current source configuration. The collector of transistor Q1 is also connected through capacitor C3 to ground.

The operation of the FIG. 3 circuit is illustrated in FIG. 4. When the trigger pulse generator 24 of the recorder 22 produces a pulse 60, FIG. 4a (which pulse is negative going for the model described), the pulse 60 is applied to pin 2 of timing circuit 56. Circuit 56 then unclamps pins 6 and 7. This permits capacitor C3 to be charged from the constant current source transistor Q1. The charging wave form of capacitor C3 is shown at 62 in FIG. 4b.

When the voltage at pins 6 and 7 of timing circuit becomes equal to the voltage at pin 5, i.e. to the amplified output from the integrators 30, 32, the voltage on pin 3 of timing circuit goes low. This is shown at 64 in FIG. 4c. Pin 3 is connected through switches 66, 67 and capacitor C4 to the base of transistor Q2. Capacitor C4 is normally discharged, since pin 3 is normally held at potential +V. When pin 3 goes low, a negative going pulse 68, FIG. 4d, is applied to the base of transistor Q2, turning on transistor Q2 momentarily. This produces a positive going clipped pulse 70 at the collector of transistor Q2, as shown in FIG. 4e. The positive going pulse 70 is inverted, squared and amplified by transistor Q3, resulting in pulse 72 (FIG. 4f) which is used to trigger the sound source 10. Pulse 72 thus constitutes a delayed trigger pulse.

Normally the d.c. level at the output of amplifier 55 is adjusted by potentimeter R6 so that the delayed trigger pulse 72 occurs at a fixed time interval t1 after the initial trigger pulse 60, provided that the fish 2 is not being subjected to any acceleration other than that of gravity. Typically the fixed delay t1 is of the order of 10 milliseconds. Then, if the fish 2 is accelerated upwardly at a frequency above the rolloff frequency of the integrators, the delay t1 is reduced. This is because the amplified output from the integrators occurs in a sense which subtracts from the preset d.c. level normally present at the output of amplifier 55 in the absence of any accelerations. The reduced delay causes the source 10 to fire earlier, to compensate for the increased time needed for the echoes to reach the fish 2. Conversely, if the fish 2 is accelerated downwardly, the delay t1 is increased (the integrator output adds to the d.c. level at the output of amplifier 55), and the source 10 will fire later.

The accelerometer compensation system just described will not compensate for very low frequency changes in the vertical position of the fish, for example when the depth fish is adjusted when the depth of the water changes. This is because, as discussed, the performance of the integrators 30, 32 is non-ideal, and includes a low frequency rolloff, to prevent integration of error signals and the like which could otherwise cause saturation of the system.

To permit depth adjustment of the fish without shifting the baseline of the chart produced by the recorder 20, the pressure transducer 36 is used. The pressure transducer 36 feeds a pressure signal via variable resistor R7 to pin 5 of a second timing circuit 80 (FIG. 4) identical with timing circuit 56. A current source connected transistor Q4 provides a minimum preset d.c. voltage level at pin 5 of timing circuit 80.

The timing circuit 80 is switched into the circuit by switch 67, which has a movable contact 84 connected to capacitor C4, and two fixed terminals 88, 90. When contact 84 is connected to terminal 88, the FIG. 3 system operates as previously described. When contact 84 is connected to terminal 90, then the timing circuit 80 becomes effective. As shown, the negative going voltage step 64 (FIG. 4c) at pin 3 of timing circuit 56 is applied via capacitor C5 to pin 2 of timing circuit 80. The negative going pulse 91 (FIG. 4g) transmitted through capacitor C5 becomes a trigger pulse for timing circuit 80.

Timing circuit 80 then unclamps its pins 6 and 7, and capacitor C6 charges through constant current source connected transistor Q5, as shown at 92, FIG. 4h. When the voltage at pins 6, 7 of timing circuit 80 becomes equal to the present voltage plus the voltage applied by pressure transducer 36 to pin 5 of timing circuit 80, pin 3 of timing circuit 80 goes low, at the end of time t2, FIG. 4h. The resultant negative going pulse applied through terminal 90 to the base of transistor Q2 acts as before to produce delayed trigger pulse 72.

As shown in FIG. 4h, the use of the pressure compensation circuit will add the further delay t2 to the pulse 72. When both the timing circuits 56, 80 are used, the total fixed delay is t1 plus t2, but t1 is subject to adjustment depending on the vertical acceleration of the fish, and t2 is subject to adjustment depending on the pressure at the level of the fish. As the pressure increases, time t2 is also increased, i.e. the pressure transducer signal adds to the voltage supplied by the current source transistor 64 to pin 5 of timing circuit 80). Times t1 and t2 are adjusted so that their total in the absence of any vertical acceleration, and at a selected depth, is an appropriate value, which will depend on the type of recorder used and the distance of the fish from the bottom. A typical total is 10 to 15 milliseconds. With the pressure compensation system in use, changes in fish depth will not cause corresponding changes in the position of the seabed on the chart.

Depending on the circumstances, the operator of the system may wish to use the pressure compensation, or acceleration compensation, or both. In a flat calm, acceleration compensation is not required. However, pressure compensation may still be needed if the distance of the fish from the bottom is subject to variation.

When pressure compensation is used alone, without acceleration compensation, the switch 66 (FIG. 3) is set so that its movable contact, indicated at 100, is connected to terminal 102. With switch 66 in this condition, the trigger pulse 60 from the recorder is applied directly through capacitor C5 to pin 2 of timing circuit 80. Under these circumstances, variable resistor R7 or the resistor connected to transistor Q4 may be readjusted so that delay t2 alone is a desired value, e.g. 10 ms, at a selected depth.

When the pressure compensation is used, it is desirable to avoid firing time adjustments caused by pressure variations resulting from large waves rolling overhead. Such pressure variations due to large waves have a proportionally greater effect when the fish is at shallow depth but can have a noticeable effect even when the fish is at a substantial depth. However, it is found that wave action normally causes variations in the pressure transducer signal of frequency greater than 0.01 Hz. Therefore, as indicated in FIG. 1, the pressure transducer signal will normally be passed through the low pass filter 40, causing a rolloff of the pressure transducer signal at about 0.01 Hz. This removes most variations due to wave action from the pressure transducer signal. In addition, it eliminates double compensation which might otherwise occur when both acceleration and pressure compensation are used. Since 0.01 Hz is also the rolloff frequency of the integrators 30, 32 (as determined by capacitor C2), and is the rolloff frequency for capacitor C1, the accelerometer and pressure compensation ranges will not then overlap except at their rolloff regions. The respective frequency responses are shown in FIG. 5, where the pressure transducer signal applied through low pass filter 40 is indicated at 110, and the double integrated signal from the accelerometer is indicated at 112. The preferred crossover frequency is indicated as 0.01 Hz, but this may vary depending on the characteristics of the fish and the towing vessel.

It will be appreciated that if desired, the pressure compensation and acceleration compensation signals can be summed and used to operate a single timing circuit.

What I claim is:

1. An underwater seismic system for producing sound signals in water and for recording echoes from the bottom beneath the surface of such water, comprising:
   (1) a body adapted to travel through said water and including
      (a) a sound source for generating a sound signal, said source including input trigger means responsive to a trigger pulse received thereat for generating said sound level,
      (b) a receiver for receiving echoes from said bottom,
   (2) a recorder connected to said receiver for recording said echoes, said recorder including repetitive sweep means, and means for generating a first start signal upon commencement of each sweep,
   (3) delay means including:
      (a) pressure compensation means comprising a pressure transducer located in said body for producing a pressure signal indicative of the depth of said body, said pressure signal having a steady state value when the water pressure above said body is constant and said pressure signal changing in a first sense when the water pressure above said body decreases and changing in an opposite sense from said steady state value when the water pressure above said body increases,
      (b) means connected to said recorder for receiving said first start signal from said recorder,
      (c) means connected to said pressure compensation means for receiving said pressure signal and also connected to said means (b) and responsive to receipt of said first start signal for thereupon generating a second start signal at a time delayed from said first start signal by a time interval which has a predetermined value when said pressure signal has said steady state value and which decreases from said predetermined value when said pressure signal changes in said first sense and which increases from said predetermined value when said pressure signal changes in said opposite sense,
      (d) means connecting said means (c) to said input trigger means for said second start signal to constitute said trigger pulse, so that vertical movement of said body beneath said surface of said water will cause compensating variations in the time of operation of said source.

2. A system according to claim 1 wherein said means (c) includes a low pass filter connected to said pressure transducer to attenuate pressure signals above a selected frequency, to reduce the effect on said time interval of pressure changes at said body above said selected frequency.

3. A system according to claim 2 wherein said selected frequency is 0.01 Hz.

* * * * *